Dec. 12, 1939.                P. BONAPACE                2,183,114
                              MEAT CHOPPER
                           Filed Oct. 29, 1938
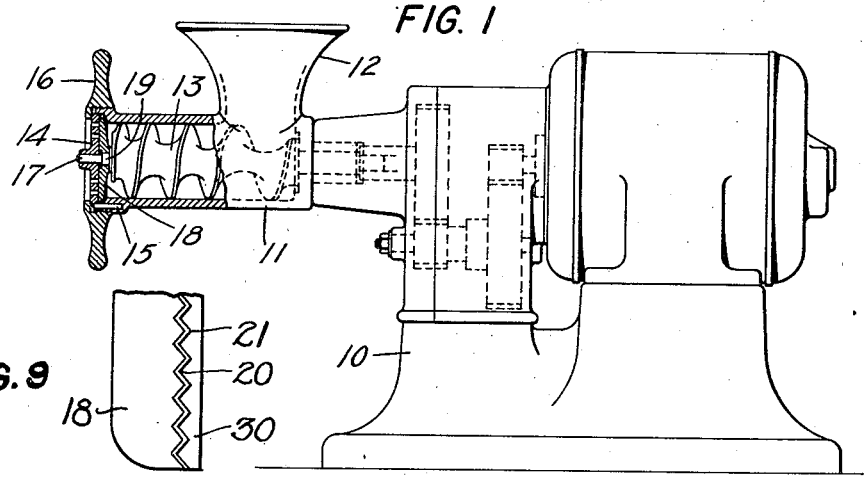
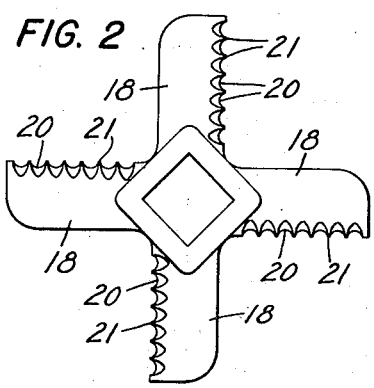 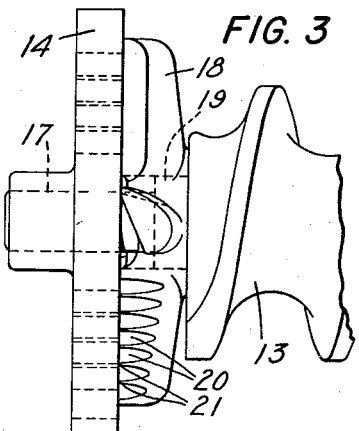 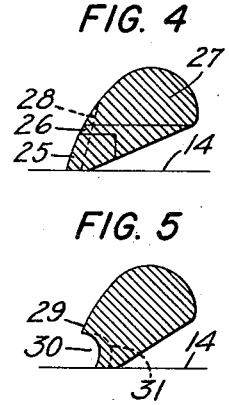
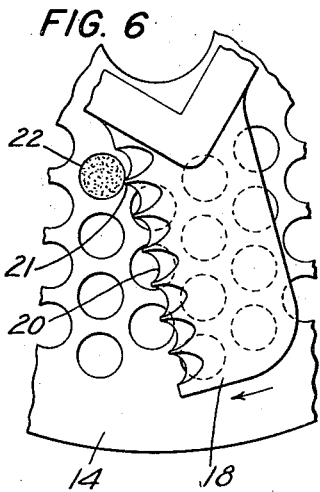 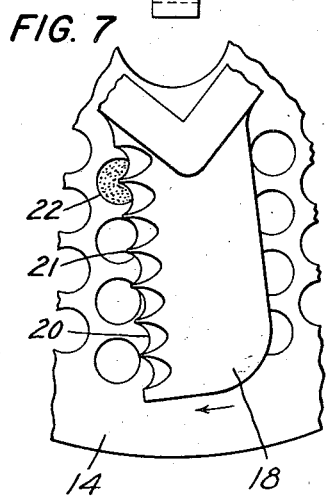 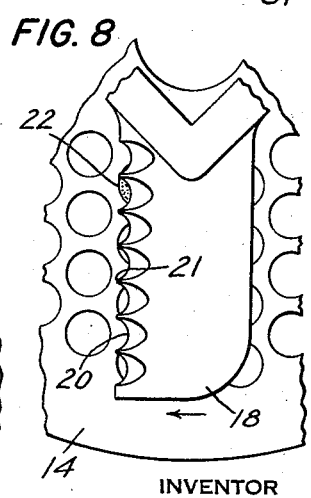
INVENTOR
Pietro Bonapace
BY
Albert F. Nathan
ATTORNEY Patented Dec. 12, 1939

2,183,114

UNITED STATES PATENT OFFICE 2,183,114

MEAT CHOPPER

Pietro Bonapace, Piscataway Township, Middlesex County, N. J.

Application October 29, 1938, Serial No. 237,666

2 Claims. (Cl. 146—189)

This invention relates to improvements in meat choppers and more particularly to improvements in the meat chopping cutter of such machines. A primary aim of the invention is to facilitate the chopping of meats and other foodstuffs that may be fed through the chopper and to effect the chopping of mixtures containing tough portions such as sinews, tendons, and grissly matter, with greater ease and efficiency and with superior uniformity in the ground product.

In the usual form of meat chopper a somewhat plain straight-bladed cutter was rotated over the face of a perforated disc. The cutting action that resulted simulated a straight shear cut, modified, however, by the tendency of the tougher portions of the meat to ride radially outwardly along the leading edge of the cutter blades causing intense crowding and jamming around the outer periphery of the feed throat of the chopper. Frequent stopping and cleaning of the chopper, attended by severe waste in material was, in consequence, required.

The present invention undertakes to overcome this difficulty by the provision of a cutter which, in cooperation with the perforated pressure plate, is of such character as will effectively prevent the above mentioned "riding away" of portions to be ground and which will, in effect, grip the meat along the entire blade and hold it radially in position to be forced into all of the holes in the plate.

Still another object of the invention is to effect the severing of the meat in small portions by a type of relative movement between the knife edge and the sides of the holes of the shear plate, that combines both the shear and the draw types of motion to the end that the material as well as the occasional sinews and tendon portions encountered, may be cut with greater ease and efficiency.

Still a further aim of the invention is to effect the chopping of the meats in a way productive of a more highly comminuted and homogeneous mix, with a shear plate of a given size and number of holes, than has been possible heretofore.

A further object of this invention is to render available a replaceable meat chopper cutter of comparatively simple form and structure for coping with the difficulties heretofore experienced with meat choppers, and which may be easily installed in existing choppers and effectively carry out the aims and objectives of this invention.

In realizing the aims of the invention it is proposed to construct a cutter in which the leading edges of the blades are provided with a continuous series of teeth, of preferably concave form, which are so proportioned with respect to the size and spacing of the holes in the shear plate that there is a mutual overlapping of the teeth of the cutter with the holes in the plate. One result of a formed cutter of this character is very materially to increase the total length of the cutting edge of each blade without increasing the blades' radial dimension, and as all of this increased cutting edge passes over the holes in the plate, a cutting action that is definitely partly draw and partly shear is produced.

Another result of the serrated tooth blade is that it presents a deeply roughened surface to the material to be chopped and prevents the material from sliding radially outwardly along the blade. Additionally, the apexes or points of intersection of the teeth operate to pierce the meat fibres as it is pressed into the holes and to divide it into at least two sections which, as will be readily understood, are cut from the main mass with far greater facility than would a single pellet of the full diameter of the hole in the plate.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which—

Figure 1 illustrates a meat chopper, partly in section, embodying this invention.

Figs. 2 and 3 are respectively plan and side views of the improved form of cutter.

Figs. 4 and 5 are sectional views of cutter blades incorporating this invention.

Figs. 6, 7, and 8 are enlarged detail views representing three different stages of the cutting action.

Fig. 9 is an underside view of a variant form of blade.

Referring more particularly to Fig. 1 of the drawing, the invention is disclosed in connection with a standard form of meat chopper which consists of a main support 10, a chopper body 11 and an entrance funnel 12 for the meat. A chopper worm 13 is journaled in the body 11 and which may be propelled by hand in the usual way or by power as indicated in the drawing.

The forward end of the chopper body is closed by a perforated plate 14 which is held against angular movement by a key 15, and against endwise movement by a flanged hand nut 16 threaded to the body. An end stud 17 provided by the worm 13 supports and centers that end of the worm relative to the plate and to the chopper body. The cutter 18 is mounted upon a squared portion 19 of the worm or stud 17 and lies between the end of the worm and the perforated plate.

The usual operation is to drop the meat to be ground into the chopper above the feed worm. The meat falls through and is caught by the worm and propelled forward between its convolutions. As it reaches the perforated plate it is placed under pressure by oncoming material and forced into the holes in the plate. Meanwhile the knife blades of the cutter 18 successively sever the portions that enter the holes and as a consequence the material being treated is discharged from the machine as a mass of small pellets. To produce a coarse chopping, a plate with fewer but larger holes is used or a cutter with fewer blades, and the converse if a relatively fine chopping is desired.

The usual or conventional meat chopper, however, has not proved satisfactory in many respects. Certain difficulties have been encountered in the way of improper and non-uniform chopping of mixed material (lean and fat meats for example). Also, frequent clogging of the chopper throat was experienced with the prior choppers which, additionally, were inefficient in their operation and costly to maintain because of the necessity of repeated cleaning and frequent cutter replacement.

The present invention undertakes to obviate the disadvantages existing in the prior meat choppers by providing a special form of cutter that may be inserted in existing machines and used over extended periods without clogging or requiring resharpening. Such a cutter has been found to efficiently and effectively chop all varities of meats that are usually fed through the chopper into a state of finely comminuted and mixed form with a minimum degree of effort.

Figs. 2–8 illustrate a meat chopper cutter designed to carry out the objectives herein mentioned. Fig. 2 illustrates a four bladed cutter in which the leading edges of each of the blades are provided with a continuous series of indentations or scallops 20 extending substantially its full radial length. The leading edges of the blades 18 are provided with the usual rake angle as shown in Figs. 3 and 4 to facilitate the cutting operation. As illustrated in Fig. 3 the cutting side of the cutter is flat and is held in cutting relation with the perforated pressure plate 14 by the pressing action of the flanged hand screw 16.

Each of the grooves 20 of the cutter extend rearwardly in the general direction of the inclined leading edge of the blade and form in effect a series of channels extending in the same general direction as the flow of material through the chopper which assist in the guiding of the material to the pressure plate. In the aggregate, the grooves 20 form in effect a deeply ribbed or corrugated surface which functions effectively to grip the meat and prevent it from sliding radially outward along the blade as the blade turns. In addition, the apexes 21 of the indentations are preferably spaced apart a distance slightly less than the diameter of the holes in the perforated plate so that they present a staggered relation with the holes in the plate. The construction is such that the point 21, for example, as shown in Fig. 6, will intercept the hole 22 in the shear plate approximately on its diameter, whereas, other points on the same blade will intercept the other holes at one side or the other of the respective diameters, each point however, operating to grip and to pierce the material undergoing treatment into two portions as the blade passes over the various holes in the plate.

Figs. 6, 7 and 8 illustrate respectively a starting, an intermediate, and an end position of the saw tooth blade relative to the same hole or series of holes in the shear plate. Fig. 6 represents the position where the point 21 of the knife is about to pierce the material that has been forced into the hole 22. Fig. 7 illustrates the position of the knife part way across the hole, Fig. 8 represents the position of the knife relative to the hole as it completes the cut and illustrates the act of severing being completed in two distinct portions. The other points along the saw tooth blade operate in a similar manner with respect to the holes that they pass over.

It will be evident from the foregoing that by providing the cutting edge of each blade with a series of relatively deep indentations whether curved as shown, or V-shaped, has the effect of greatly increasing the effective length of the cutting edge without any increase in the physical radial length of the blade. In consequence, various sections of the cutting edge in effect move with a combined shear and draw cut action over the holes in the plate. Severing of the meat and particularly the more tough and membranous portions thereof is thus effected by a carving action and hence with greater ease and facility than the plain shear cut action of the former styles of straight edge knives.

As a result, the material is severed with less tendency for it to slide radially outward and become jammed around the outer periphery which would cause the machine to labor and become considerably less efficient. With the present invention, outward movement of the material is, of course, additionally restrained by the gripping action of the saw teeth along the cutter blade, which teeth offer greatly increased resistance to radial movement of the material and practically no resistance to movement in the direction of normal flow of the material through the chopper.

Figs. 4 and 5 illustrate alternative forms of cutters each, however, embodying the characterizing feature of this invention of a saw tooth form of leading cutter edge. In Fig. 4 the actual cutting element 25 brazed or otherwise secured as at 26 to a main support or backing member 27, the whole laminated structure being grooved as shown by the dotted line 28 along its forward face to provide the continuous series of indentations shown in Fig. 2. Fig. 5 illustrates another form of cutter adapted for tough material and in which a portion 29 of the blade of the cutter overhangs the saw tooth cutting edge. This form of structure provides a shallow pocket 30 within which the material is continuously pressed by the action of the feed screw and effectively caught thereby as the cutter rotates. This form of cutter is also provided with a continuous series of indentations 31 extending along the cutting edge and operates in the same manner as the cutter explained previously in connection with Figs. 6, 7, and 8.

As with the previous cutters, the cutter illustrated in Fig. 5 may be formed from the solid or with replaceable hardened knives. The laminated form of cutter, however, may if desired have the metal inserts preformed to the required shape and thereafter secured in position to the cutter body as illustrated in Fig. 9.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A cutter for a food chopper having a pressure plate provided with a series of holes, comprising a member having a plurality of radially extending arms adapted to be rotated over the face of the plate, each of said arms affording a leading cutting edge tangentially disposed relative to the axis of rotation and serrated therealong, the apexes of the serrations being spaced apart less than the diameter of the holes in the pressure plate so as to pierce the material into two or more parts as it is passed through the holes in the plate and to sever same with a combined drawing and shearing action, said serrations serving as positive means for gripping the material and restraining same against movement along the tangential leading cutting edge of the arms, and each of said arms being further provided with a portion that overhangs the tangential leading cutting edge thereof and is spaced from the plane of the plate to form a tangentially extending recess for receiving material and preventing rearward repulsion thereof during the severing action.

2. The combination set forth in claim 1 in which the said serrations on each arm of the cutter member is comprised of a preformed corrugated member securely attached to the plate side of each arm as and for the purpose set forth.

PIETRO BONAPACE.